US008930382B2

(12) United States Patent
Branish, II et al.

(10) Patent No.: US 8,930,382 B2
(45) Date of Patent: Jan. 6, 2015

(54) HIGH PERFORMANCE SECURE DATA ACCESS IN A PARALLEL PROCESSING SYSTEM

(71) Applicant: International Business Machines Corporation, Armonk, NY (US)

(72) Inventors: Edward Gust Branish, II, Hanover, NH (US); Veerabhadra Chinnam, Ponte Vedra Beach, FL (US); George Richard Hughes, Jr., Overland Park, KS (US); James Sun, Lewisville, TX (US)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 13/648,587

(22) Filed: Oct. 10, 2012

(65) Prior Publication Data

US 2014/0101129 A1    Apr. 10, 2014

(51) Int. Cl.
*G06F 7/00* (2006.01)
*G06F 17/30* (2006.01)

(52) U.S. Cl.
USPC ............................................ 707/757

(58) Field of Classification Search
None
See application file for complete search history.

(56) References Cited

U.S. PATENT DOCUMENTS

| 5,548,769 | A  | 8/1996 | Baum et al. |
| 5,799,310 | A  | 8/1998 | Anderson et al. |
| 7,346,906 | B2 | 3/2008 | Kelly et al. |
| 7,720,840 | B2 | 5/2010 | Day et al. |
| 2007/0220004 | A1 * | 9/2007 | Fifield et al. ............... 707/9 |
| 2009/0055418 | A1 | 2/2009 | Megerian |
| 2009/0094193 | A1 * | 4/2009 | King et al. ............... 707/2 |
| 2010/0042643 | A1 * | 2/2010 | Pattabhi et al. ............... 707/102 |

OTHER PUBLICATIONS

Wang, Q.-et al.; "On the Correctness Criteria of Fine-Grained Access Control in Relational Databases"; VLDB '07; ACM 978-1-59593-649; Sep. 23, 2007.
Oracle Corporation; "Data Masking Best Practices"; www.oracle.com/whitepaper; Jul. 2010.
Pfister, G.-et al.; "Parallel Equi-Join Algorithm for Large Relational Data Base Operations"; http://www.ip.com/pubview/IPCOM000040297D; Feb. 2, 2005.
Krieg, GJ-et al.; "Fast Table Joining in Relational Data Bases and Fast Row Retrieval"; http://www.ip.com/pubview/IPCOM000039669D; Feb. 1, 2005.
Cheng, JM.-et al.; "Multiple Indexed Access Path in a Relational Database System"; http://www.ip.com/pubview/IPCOM000100270D; Mar. 15, 2005.

* cited by examiner

*Primary Examiner* — Uyen Le
(74) *Attorney, Agent, or Firm* — Patricia B. Feighan; Jeff LaBaw

(57) ABSTRACT

A mechanism is provided for secure data access in a parallel processing system. A database having two tables is provided. A subset of the tables' primary key attributes is considered sensitive. A first user is authorized to access the primary key's sensitive attribute in an unmasked format, while a second user is authorized to access same data in a masked format. Two security tables are generated having a plurality of entries mapping the values of the primary key attribute in the unmasked format to the values of the primary key attribute in the masked format. A security view is generated joining the two security tables. The security view grants the first user access to the values of the primary key's sensitive attribute in the unmasked format only and grants the second user access to the values of the primary key's sensitive attribute in the masked format only.

20 Claims, 7 Drawing Sheets

CUSTOMER_TRANSACTION_1_T 150

| ACCOUNT CLEAR | TRANSACTION_ID | TRANSACTION_DATE | TRANSACTION_AMOUNT |
|---|---|---|---|
| 010203302010 | 5445 | 5/1/2001 | 44.00 |
| 020301103020 | 5555 | 5/5/2001 | 55.55 |
| 067777777760 | 4455 | 5/12/2001 | 43.00 |
| 111111111111 | 2222 | 8/17/2004 | 11.22 |

*FIG. 2A*

CUSTOMER_TRANSACTION_2_T 152

| ACCOUNT CLEAR | TRANSACTION_ID | TRANSACTION_DATE | TRANSACTION_CITY | TRANSACTION_STATE | TRANSACTION_ZIP |
|---|---|---|---|---|---|
| 010203302010 | 5445 | 5/1/2001 | ROCHESTER | MN | 55903 |
| 020301103020 | 5555 | 5/5/2001 | NEW YORK | NY | 10005 |
| 067777777760 | 4455 | 5/12/2001 | ROCHESTER | MN | 55903 |
| 111111111111 | 2222 | 8/17/2004 | NEW YORK | NY | 10005 |

CUSTOMER_TRANSACTION_1

| ACCOUNT | TRANSACTION_ID | TRANSACTION_DATE | TRANSACTION_AMOUNT |
|---|---|---|---|
| 010203302010 | 5445 | 5/1/2001 | 44.00 |
| 020301103020 | 5555 | 5/5/2001 | 55.55 |
| 067777777760 | 4455 | 5/12/2001 | 43.00 |
| 111111111111 | 2222 | 8/17/2004 | 11.22 |

CUSTOMER_TRANSACTION_1

| ACCOUNT | TRANSACTION_ID | TRANSACTION_DATE | TRANSACTION_AMOUNT |
|---|---|---|---|
| 121314413121 | 5445 | 5/1/2001 | 44.00 |
| 131412214131 | 5555 | 5/5/2001 | 55.55 |
| 178888888871 | 4455 | 5/12/2001 | 43.00 |
| 123456789098 | 2222 | 8/17/2004 | 11.22 |

*FIG. 5B*

HIGH PERFORMANCE SECURE DATA ACCESS IN A PARALLEL PROCESSING SYSTEM

TECHNICAL FIELD

The present invention relates generally to computer database systems and more specifically to high performance secure data access in a parallel database system.

BACKGROUND

Databases are computerized information storage and retrieval systems. A relational database management system (RDBMS) is a computer database management system that uses relational techniques for storing and retrieving data. Relational databases store data using structures that include one or more tables of rows and columns, which may be interrelated. A RDBMS typically uses Structured Query Language (SQL) for data definition, data management, and data access and retrieval. A database schema is used to specify how data is stored in a collection of tables and how the tables are related to one another. Using database query languages, such as SQL, data stored in a computer database may be retrieved, updated, and deleted. Updates may include creating new tables or dropping old tables, inserting, modifying, or deleting rows in an existing table, and copying tables or rows within the database.

One of the goals of a RDBMS is to optimize the performance of queries for access and manipulation of data stored in the database. Given a target environment, an optimal query plan is selected, with the optimal query plan being the one with the lowest cost (e.g., response time) as determined by an optimizer. The response time is the amount of time it takes to complete the execution of a query on a given system.

There are several types of database systems available, including parallel data processing systems. A parallel data processing system may include RDBMS with enhancements that allow the data in the tables to be shared among the nodes (partitions) of massively parallel processing (MPP) system. A node can be an independent processor on an MPP machine, or a separate machine belonging to a clustered hardware environment. The RDBMS may perform join or subquery processing at the database partition in which the data is stored. This can have significant performance advantages. In MPP systems, the processing costs for performing non-collocated joins can become undesirable. As is understood, a join comprises a SQL operation that combines records from two or more tables. Efficient collocated joins are critical to the performance of parallel data processing systems.

SUMMARY

In one aspect, a method, system and program product for secure data access in a parallel processing system are provided. The method comprises providing a relational database having a first table and a second table. An attribute serves as a subset of primary key attributes for the first table and for the second table. The attribute is considered sensitive, and needs to be prevented from unauthorized disclosure. A first user is authorized to access values of the primary key's sensitive attribute in an unmasked format. A second user is authorized to access values of the primary key's sensitive attribute in a masked format. The method further comprises generating a first security table having a plurality of entries mapping the values of the primary key's sensitive attribute in the unmasked format to the values of the primary key's sensitive attribute in the masked format. The masked format values of primary key's sensitive attributes are unique. The method further comprises generating a second security table having a plurality of entries mapping the values of the primary key's sensitive attribute in a masked format to the values of the primary key's sensitive attribute in the unmasked format. The method further comprises generating a security view joining the first security table to the second security table. The security view grants the first user access to the values of the primary key's sensitive attribute in the unmasked format only. The security view grants the second user access to the values of the primary key's sensitive attribute in the masked format only.

BRIEF DESCRIPTION OF THE SEVERAL VIEWS OF THE DRAWINGS

FIGS. 2A and 2B illustrate data in exemplary customer transaction tables, according to one embodiment of the present invention.

FIGS. 5A and 5B illustrate transaction table data presented to database users having different authority levels, according to one embodiment of the present invention.

DETAILED DESCRIPTION

Figure 1:
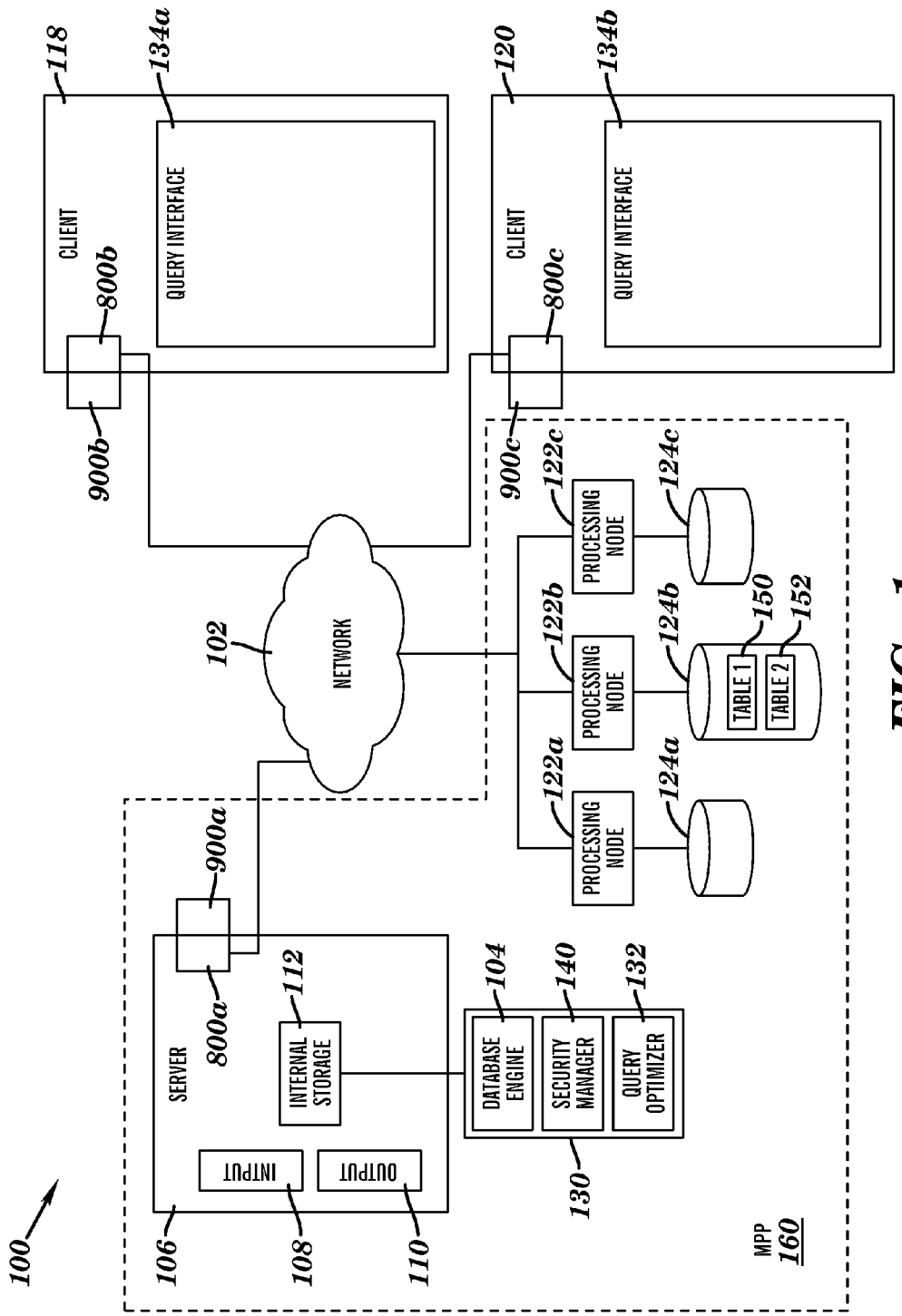
FIG. 1 is an illustration of an exemplary architecture for a parallel data processing system that is suited for implementing secure data access and optimized collocated join operations in accordance with an embodiment of the present invention.

Embodiments of the present invention will now be described with reference to the figures. Various embodiments of the present invention may be implemented generally within any parallel processing relational database management system environment suited for performing collocated join operations. More specifically, a table may be divided among a plurality of processing nodes in the parallel data processing system. Such a mechanism is referred to herein as partitioning. Typically, a table is partitioned on a primary key by hashing the rows on the primary key value and distributing the rows to a particular processing node based on the primary key hash value (also known as partitioning key or hash key). To achieve high performance, a technique known as join collocation is typically used in the parallel data processing system. The database management system is capable of recognizing when data being accessed for a join or a subquery is located at the same database partition. This is known as table collocation. Rows in collocated tables with the same distribution key values are located on the same database partition. A collocated join occurs locally on the partition where the data resides. After the local joins complete on all partitions, the partial results are combined, producing a global result which would be identical to the result obtained on a non-parallel processing relational database management system environment, For the optimizer program to consider a collocated join, the joined tables should be collocated, have distribution keys with the same number of attributes, have the corresponding attributes of the distribution key be database partition-compatible, and all pairs of the corresponding partitioning key attributes should participate in equality join predicates.

Typically, in parallel data processing systems, access to some of the tables' primary key attribute values is denied due to security and privacy concerns with regard to "sensitive attributes". In the parallel data processing system described herein, instead of denying access altogether, the primary key's sensitive attribute values are masked before they are provided to a user. As used herein, the term "masking" refers to the process of providing data that conforms to particular characteristics, such as data type and data format, without revealing sensitive underlying data. For example, instead of providing a requested social security number to an unprivileged user, the RDBMS masks the social security number by, for example, encrypting the social security number using any technique known to those skilled in the art. However, it should be noted that in accordance with various embodiments of the present invention, the selected encryption technique should generate unique masked (encrypted) values. Depending on the users' role and their authority level within the enterprise, each user will typically see either unmasked text or a masked version of the primary key's sensitive attribute, but not both.

Embodiments of the invention are described herein relative to the widely used SQL query language. However, various embodiments of the invention are not limited to the SQL query language. Embodiments of the invention may be adapted to relational database queries composed in other query languages.

FIG. 1 is an illustration of an exemplary architecture for a parallel data processing system that is suited for implementing secure data access and optimized collocated join operations in accordance with an embodiment of the present invention. FIG. 1 is intended as an exemplary embodiment, not as an architectural limitation for different embodiments of the present invention, and therefore, the particular elements shown in FIG. 1 should not be considered limiting with regard to the environments in which the illustrative embodiments of the present invention may be implemented. Additionally, those skilled in the art will recognize that the elements illustrated in FIG. 1 are simplified to highlight aspects of the present invention and that computing environments and networks typically include a variety of additional elements not shown in FIG. 1. As shown in FIG. 1, the parallel data processing system 100 includes two client computers 118 and 120 coupled to a server computer 106 and one or more processing nodes 122a-122c, that manage the storage and retrieval of data in storage devices 124a-124c, via a network 102 such as the Internet. For simplicity purposes, only three processing nodes 122a, 122b and 122c and only three storage devices 124a, 124b, and 124c are shown in FIG. 1, although in other embodiments, parallel data processing system 100 can include additional processing nodes connected to additional storage devices. The parallel data processing system 100 includes the RDBMS 130 built upon a massively parallel processing (MPP) system 160.

As shown, the parallel data processing system 100 includes one or more processing nodes 122a-122c that manage the storage and retrieval of data in storage devices 124a-124c. Each of the processing nodes hosts one or more logical nodes or data partitions, such as one or more database instances. Each of the processing nodes 122a-122c manages a portion of a database that is stored in a corresponding one of the storage devices 124a-124c. In an embodiment, each of the processing nodes 122a-122c manages the corresponding portion of the database using a schema (not shown in FIG. 1). The schema provides a description of how the data is represented and organized within the database built upon MPP system 160. For a relational database, the schema specifies the tables, attributes of the tables, and relationships between the tables. In addition, the schema specifies the data types of attributes in a table and any constraints on a table or attribute. For example, the schema identifies relationships enforced as a referential integrity constraint between first table 150 and second table 152 of the database hosted by the parallel data processing system 100. Each of the storage devices 124a-124c includes one or more hard-disk drives or other storage medium, such as flash memory devices, optical media, and the like.

The system stores data in one or more tables 150, 152 in the storage devices 124a-124c. At least in some embodiments the rows of the tables 150, 152 are stored across multiple storage devices 124a-124c to ensure that the system workload is distributed evenly across the processing nodes 122a-122c.

As will be discussed with reference to FIG. 7, server computer 106 includes internal components 800a and external components 900a, client computer 118 includes internal components 800b and external components 900b, and client computer 120 includes internal components 800c and external components 900c. For simplicity purposes, only two client computers 118 and 120 are shown in FIG. 1, although in other embodiments, parallel data processing system 100 can include additional client computers. Network 102 represents a worldwide collection of networks and gateways that use the Transmission Control Protocol/Internet Protocol suite of protocols to communicate with one another. At the heart of the Internet is a backbone of high-speed data communication lines between major nodes or host computers consisting of thousands of commercial, governmental, educational and other computer systems that route data and messages. Alternatively, the computers and other devices of distributed data processing system 100 may be interconnected by different types of networks, such as an intranet, a local area network (LAN), or a wide area network (WAN). Network 102 may include communication connections, such as wire, wireless communication links, or fiber optic cables.

Client computers 118 and 120 may be, for example, mobile devices, telephones, personal digital assistants, netbooks, laptop computers, tablet computers, desktop computers, or any type of computing devices capable of hosting a query interface 134a and 134b. In one embodiment, query interface 134a and 134b provides a software application that allows users to create, read, update and delete information stored in storage devices 124a-124c. Query interface 134a, 134b allows users to compose and submit SQL commands to a RDBMS 130, which, in response, may be configured to process the SQL and return query information, or results of update actions.

Typically, query interfaces 134a and 134b display information via a display device 920 of external components 900b (shown in FIG. 7) and a display device 920 of external components 900c (shown in FIG. 7), respectively, such as a monitor, a laptop screen, television, or the like, and receive input from the user via one or more input devices which can include, without limitation, a keyboard, a mouse, a trackball, a digitizing tablet, and the like.

As shown in FIG. 1, server computer 106 includes a RDBMS 130 that includes a database engine program 104, query optimizer program 132 and security manager program 140. In one embodiment, the actions performed by RDBMS 130 are controlled via query interface 134a or 134b. RDBMS 130 receives queries in a form of SQL statements. Database engine program 104 is used to create, retrieve, update, and delete data from storage devices 124a-124c. Database engine program 104 may also perform other database operations. For example, in an embodiment of the present invention, database engine program 104 organizes the storage of data and the distribution of table rows among the processing nodes 122a-122c. Database engine program 104 may also coordinate the retrieval of data from the storage devices 124a-124c in response to queries received from a user, such as one using query interface 134a and 134b. In an embodiment, database engine program 104, on receiving an incoming database query, sends the query to query optimizer program 132. In an embodiment, query optimizer program 132 includes program instructions executable by server computer 106 to optimize a query and/or select an optimal query execution plan. Selecting the optimal query execution plan includes, among other things, identifying which of the processing nodes 122a-122c are involved in executing the query, as well as choosing which data manipulation techniques will serve best in satisfying the conditions of the query. In an embodiment, security manager program 140 includes program instructions executable by server computer 106 to control access to data that is subject to data security management. Controlling access to sensitive data includes determining whether to grant access to the requested data in either a masked or an unmasked format based at least in part on a requesting user's authentication credentials. Database engine program 104, query optimizer program 132, and security manager program 140 located in parallel data processing system 100 may be stored on one or more computer-readable tangible storage devices, which may include internal storage 112 on server computer 106. Parallel data processing system 100 may include additional server computers, client computers, displays and other devices not shown. Server computer 106 may contain an input device 108 and an output device 110. FIGS. 2A-6 provide an example of a high performance secure data access in a parallel data processing system 100 using an example customer database containing at least two transaction tables 150 and 152.

FIGS. 2A and 2B illustrate data in exemplary customer transaction tables, according to one embodiment of the present invention. The database tables are typically generated through a "CREATE TABLE" statement that specifies the table name (or relationship) and the attributes that make up the table. An example of a "CREATE TABLE" SQL statement that generated CUSTOMER_TRANSACTION1_T table 150 (referred to herein as a first transaction table) illustrated in FIG. 2A, is provided below:

```
CREATE TABLE CUSTOMER_TRANSACTION1_T (
ACCOUNT_CLEAR          INTEGER NOT NULL,
TRANSACTON_ID          INTEGER NOT NULL,
TRANSACTION_DATE       DATE NOT NULL,
TRANSACTION_AMOUNT     DECIMAL(15,2) NOT NULL
PRIMARY KEY (ACCOUNT_CLEAR,
    TRANSACTION_ID,
    TRANSACTION_DATE) )
DISTRIBUTE BY HASH (ACCOUNT_CLEAR);
```

First transaction table 150 includes four attributes: "ACCOUNT_CLEAR" 202, "TRANSACTION_ID" 204, "TRANSACTION_DATE" 206, and "TRANSACTION_AMOUNT" 208. Illustratively, the first row 209 in first transaction table 150 contains the following values:
ACCOUNT_CLEAR: 010203302010
TRANSACTION_ID: 5445
TRANSACTION_DATE: 5/1/2001
TRANSACTION_AMOUNT: 44.00

Other rows of first transaction table 150 include similar values related to transactions. Illustratively, first transaction table 150 includes four rows. It should be noted, that any given row of data of table 150 is eligible to be stored in any of the processing nodes 122a-122c. The table definition above specifies that rows are mapped to a particular partition based on a partitioning key. More specifically, the table definition specifies that a hash value of the "ACCOUNT_CLEAR" attribute serves as the partitioning key. For example, database engine program 104 may need to add an additional processing node, such as processing node 122c, to a list of processing nodes storing data in first transaction table 150, database engine program 104 uses the partitioning key attribute as a reorganization mechanism. A variety of well known in the art techniques may be used for partitioning tables. In an embodiment of the present invention, hash function applied to the values of the "ACCOUNT_CLEAR" attribute may include, for example, linear hash function, modulo hash function, and the like.

An example of a create table SQL statement that generated CUSTOMER_TRANSACTION2_T table (referred to herein as a second transaction table) 152 illustrated in FIG. 2B, is provided below:

```
CREATE TABLE CUSTOMER_TRANSACTION2_T (
ACCOUNT_CLEAR          INTEGER NOT NULL,
TRANSACTION_ID         INTEGER NOT NULL,
TRANSACTION_DATE       DATE NOT NULL,
TRANSACTION_CITY       VARCHAR(30) NOT NULL,
TRANSACTION_STATE      CHAR(2) NOT NULL,
TRANSACTION_ZIP        DECIMAL(5,0) NOT NULL
PRIMARY KEY (ACCOUNT_CLEAR,
    TRANSACTION_ID,
    TRANSACTION_DATE) )
DISTRIBUTE BY HASH (ACCOUNT_CLEAR);.
```

Second transaction table 152 includes six attributes: "ACCOUNT_CLEAR" 242, "TRANSACTION_ID" 246, "TRANSACTION_DATE" 248, "TRANSACTION_CITY" 250, "TRANSACTION_STATE" 252, and "TRANSACTION_ZIP" 254. Illustratively, the first row 256 in second transaction table 152 contains the following values:
ACCOUNT_CLEAR: 010203302010
TRANSACTION_ID: 5445
TRANSACTION_DATE: 5/1/2001
TRANSACTION_CITY: Rochester
TRANSACTION_STATE: MN
TRANSACTION_ZIP: 55903

Other rows of second transaction table 152 include similar values related to transaction location. It should be noted that first transaction table 150 includes a composite primary key consisting of attributes ("ACCOUNT_CLEAR" "TRANSACTION_ID", and "TRANSACTION_DATE"), which is used as a foreign key in attributes 242, 246, and 248 of the second transaction table 152. Similarly to the first transaction table 150, "ACCOUNT_CLEAR" serves as a partitioning key. According to an embodiment of the present invention, "ACCOUNT_CLEAR" represents at least one of the sensitive attributes of the composite primary key that is subject to data security management. In other words, in an embodiment of the present invention, only users with predetermined authentication credentials should have access to an unmasked value of the "ACCOUNT_CLEAR" attributes 202 and 242 stored in first transaction table 150 and second transaction table 152.

Figure 3:
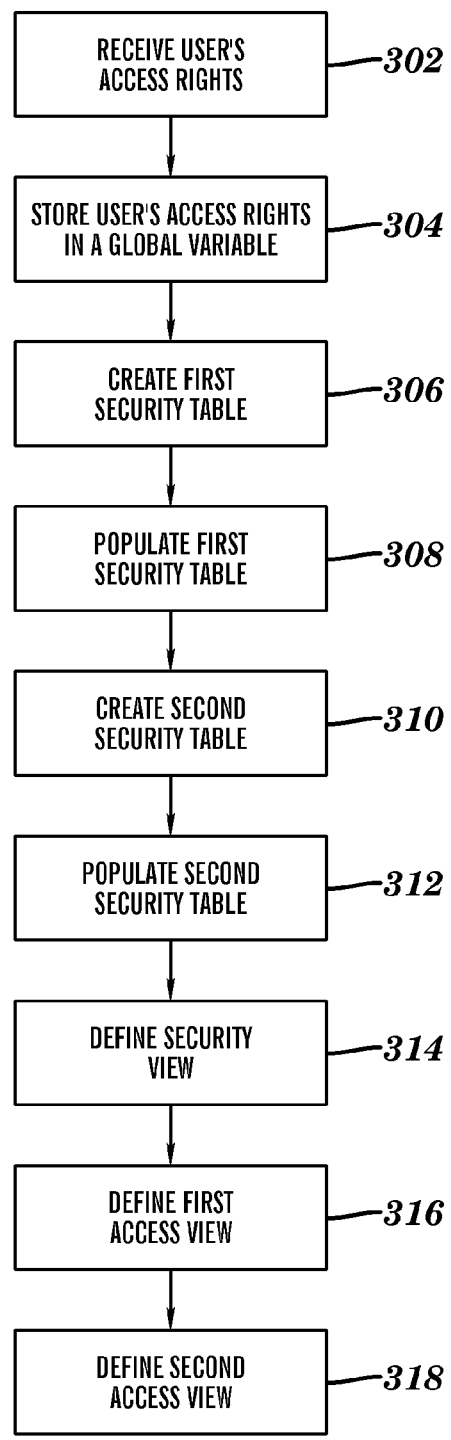
FIG. 3 illustrates steps performed by security manager program for controlling secure data access, according to one embodiment of the present invention.

FIG. 3 illustrates steps performed by security manager program for controlling secure data access, according to one embodiment of the present invention. The security manager program can be, for example, security manager program 140 of FIG. 1. The security manager program 140 controls access to sensitive data (for example, "ACCOUNT_CLEAR" attribute) by employing at least two security tables as described below. In an embodiment of the present invention, the join of the two security tables is implemented as a view for reasons such as convenience, ease of implementation, and layer of abstraction.

At step 302, security manager program 140, executing on server computer 106 of FIG. 1, receives a user access request that contains predefined authentication credentials of the user requesting access to either first transaction table 150 or second transaction table 152. In an embodiment, authentication credentials are obtained by RDBMS 130 in response to the user's attempt to connect to the database. The credentials can include information associated with the user's role within an enterprise. As previously indicated, values contained in some attributes, such as "ACCOUNT_CLEAR" 202 and 242 of FIG. 2, are protected and access to such sensitive data is restricted at least for some authenticated users. According to an embodiment of the present invention, at step 304, security manager program 140 stores user's credentials in a global variable. For example, security manager program 140 may use the following SQL statement to create the global variable, such as, "USER_TYPE":

CREATE VARIABLE USER_TYPE SMALLINT DEFAULT 1;

In an embodiment, the value of the USER_TYPE variable equal to 0 indicates that the requesting user has authorization to access unmasked value of the protected attribute, while the value of the USER_TYPE variable equal to 1 indicates that the requesting user is permitted to access only masked value of the protected attribute. At step 306, security manager program 140 generates a first security table 400. An example of a "CREATE TABLE" SQL statement that generates first security table (CUSTOMER_SECURITY1_T) 400, illustrated in FIG. 4A, in accordance with an embodiment of the invention, is provided below:

```
CREATE TABLE CUSTOMER_SECURITY1_T (
ACCOUNT_CLEAR        INTEGER NOT NULL,
ACCOUNT              INTEGER NOT NULL,
ACCOUNT_TYPE         SMALLINT NOT NULL,
PRIMARY KEY (ACCOUNT_CLEAR, ACCOUNT_TYPE) )
DISTRIBUTE BY HASH (ACCOUNT_CLEAR);
```

As discussed below in conjunction with FIG. 4A, the first security table 400 maps the unmasked attribute value, such as unmasked account number "ACCOUNT_CLEAR", based on an indicator attribute, such as "ACCOUNT_TYPE", to the version of the attribute value, be it masked or unmasked, the requesting user is permitted to access. It should be noted that first security table 400 includes a composite primary key consisting of the aforementioned "ACCOUNT_CLEAR" and "ACCOUNT_TYPE" attributes. "ACCOUNT_CLEAR" 402 is used as a foreign key in attribute 242 of the second transaction table 152 and in attribute 202 of the first transaction table 150. Similarly to the first transaction table 150 and second transaction table 152, "ACCOUNT_CLEAR" serves as a partitioning key.

At step 308, security manager program 140 populates the first security table 400 with a plurality of entries. In an embodiment, security manager program 140 populates the first security table 400 with two entries per each unmasked account number stored in the first and second transaction tables, 150 and 152, respectively, as discussed below in conjunction with FIG. 4A. At step 310, security manager program 140 generates a second security table 440. An example of a "CREATE_TABLE" SQL statement that generates a second security table (CUSTOMER_SECURITY2_T) 440 illustrated in FIG. 4B, in accordance with an embodiment of the invention, is provided below:

```
CREATE TABLE CUSTOMER_SECURITY_T (
ACCOUNT              INTEGER NOT NULL,
ACCOUNT_CLEAR        INTEGER NOT NULL,
PRIMARY KEY (ACCOUNT, ACCOUNT_CLEAR) )
DISTRIBUTE BY HASH (ACCOUNT);
```

At step 312, security manager program 140 populates the second security table 440 with a plurality of entries. As discussed below in conjunction with FIG. 4B, the plurality of entries in the second security table 440 maps the accessible version of the sensitive attribute value, such as unmasked account number or masked account number, back to the unmasked version of the sensitive attribute value. In one implementation consistent with an embodiment of the present invention, security manager program 140 generates a unique index on the second security table 440. Unique indices are typically faster because only one row in the table matches a search. Unique indices also provide semantic information that allows the query optimizer program 132 to rewrite queries in order to perform an optimization operation. In various embodiments of the present invention, the optimization operation may include, but is not limited to, elimination of joins operation, push aggregation down through joins operation, push FETCH FIRST n ROWS down through joins operation, remove unnecessary DISTINCT operation, and the like. A possible syntax of a statement that could be used to create a unique index on the second security table 440 would be:

```
CREATE UNIQUE INDEX CUSTOMER_SECURITY2_PK
ON CUSTOMER_SECURITY2_T (ACCOUNT);
```

In addition, in accordance with an embodiment of the present invention, security manager program 140 specifies a relationship between data in first security table 400 and second security table 440 to preserve what is commonly referred to as "referential integrity". More specifically, a referential integrity constraint specifies that each row in a child table should include a valid reference to a row in the corresponding parent table. In an embodiment of the present invention, second security table 440 is defined as a referential integrity parent of the first security table 400 (also referred to as primary key/foreign key relationship). In an embodiment of the present invention, database engine program 104 is implemented to maintain consistency between rows of the first security table 400 and the second security table 440 by enforcing referential integrity constraint. For example, when a row from the second security table 440 is deleted, database engine program 104 deletes all the rows from the first security table 400 that reference the deleted row. This process is commonly referred to as a "cascading delete". Cascading updates are performed in a similar manner. An example of an SQL statement creating a referential integrity constraint is provided below:

```
ALTER TABLE CUSTOMER_SECURITY1_T
ADD CONSTRAINT CUST_SECURE1_SECURE2
FOREIGN KEY (ACCOUNT, ACCOUNT_CLEAR)
REFERENCES CUSTOMER_SECURITY2_T (ACCOUNT,
ACCOUNT_CLEAR)
NOT ENFORCED ENABLE QUERY OPTIMIZATION;
```

At step 314, security manager program 140 defines a security view which joins the first security table 400 and the second security table 440. The term "security view", as used herein, refers to a query controlling access to sensitive attributes based, at least in part, on a requesting user's authentication credentials. As mentioned above, in an embodiment of the present invention, attribute-level security may be implemented with a complex security view that restricts at least some users from sensitive table attributes for which they do not have security clearance. In an embodiment, security manager program 140 enforces access restrictions by joining the two security tables and by including a predicate, which applies the value of the global security variable (USER_TYPE). In an embodiment of the present invention, security manager program 140 defines the security view using the following exemplary SQL statement:

```
CREATE VIEW CUSTOMER_SECURITY AS                          (A)
SELECT A.ACCOUNT_CLEAR, A.ACCOUNT
FROM CUSTOMER_SECURITY1_T A,
CUSTOMER_SECURITY2_T B
WHERE A.ACCOUNT_TYPE = USER_TYPE
AND A.ACCOUNT_CLEAR = B.ACCOUNT_CLEAR
AND A.ACCOUNT = B.ACCOUNT;
```

At step 316, security manager program 140 defines a first view which is used to control access to the protected attribute (such as ACCOUNT_CLEAR) in first transaction table 150. In an embodiment, security manager program 140 controls access to the protected attribute in first transaction table 150 by, for example, joining the first transaction table 150 to the first security table 400 and the second security table 440 via the security view (A). An example of a "CREATE VIEW" SQL statement that generates first view, in accordance with an embodiment of the invention, is provided below:

```
CREATE VIEW CUSTOMER_TRANSACTION1 AS                      (B)
SELECT B.ACCOUNT, A.TRANSACTION_ID,
A.TRANSACTION_DATE, A.TRANSACTION_AMOUNT
FROM CUSTOMER_TRANSACTION1_T A,
CUSTOMER_SECURITY B
WHERE B.ACCOUNT_CLEAR = A.ACCOUNT_CLEAR;
```

Similarly, at step 318, security manager program 140 defines a second view which is used to control access to the protected attribute (such as ACCOUNT_CLEAR) in second transaction table 152 by, for example, joining the second transaction table 152 to the first security table 400 and the second security table 440 via the security view (A). An example of a "CREATE VIEW" SQL statement that generates the second view, in accordance with an embodiment of the invention, is provided below:

```
CREATE VIEW CUSTOMER_TRANSACTION2 AS                      (C)
SELECT B.ACCOUNT, A.TRANSACTION_ID,
A.TRANSACTION_DATE, A.TRANSACTION_CITY,
A.TRANSACTION_STATE, A.TRANSACTION_ZIP
FROM CUSTOMER_TRANSACTION2_T A,
CUSTOMER_SECURITY B
WHERE B.ACCOUNT_CLEAR = A.ACCOUNT_CLEAR;
```

Thus, in an embodiment of the present invention, as discussed below in conjunction with FIGS. 5A and 5B, the security manager program 140 protects sensitive attributes of the transaction tables by allowing users having different authority levels to access the transaction tables via a plurality of views generated by the security manager program 140.

Figure 4A:
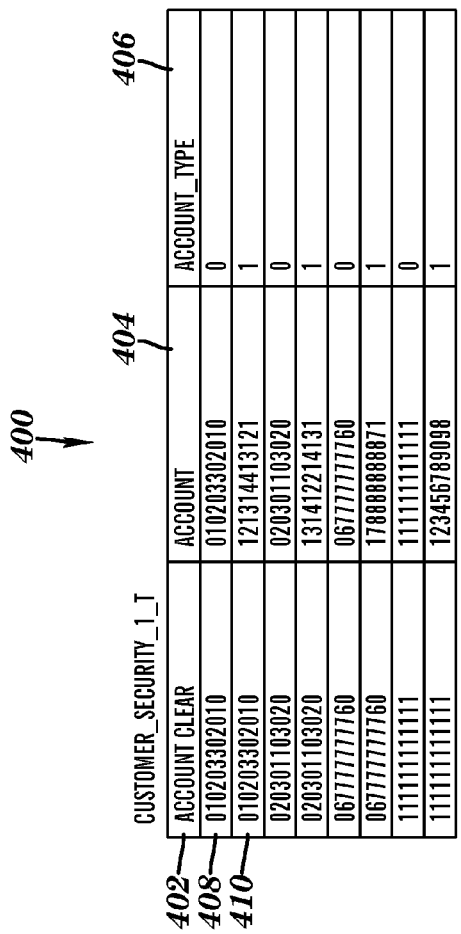
FIGS. 4A and 4B illustrate data in exemplary security tables, according to one embodiment of the present invention.

FIG. 4A illustrates exemplary data in first security table 400, according to one embodiment of the present invention. As previously indicated, the security manager program 140 populates (at step 308) the first security table 400 in order to map the unmasked attribute value, such as unmasked account number, based on an indicator attribute, such as "ACCOUNT_TYPE", to the version of the attribute value, be it masked or unmasked, the requesting user is permitted to access. First security table (for example, CUSTOMER_SECURITY1_T table) 400 includes three attributes: "ACCOUNT_CLEAR" 402, "ACCOUNT" 404, and "ACCOUNT_TYPE" 406. Illustratively, the first row 408 and the second row 410 in the first security table 400 contain the following values, respectively:

| Account_Clear: | 010203302010 | Account_Clear: | 010203302010 |
| Account: | 010203302010 | Account: | 121314413121 |
| Account_Type: | 0 | Account_Type: | 1 |

It should be noted that data contained in the first row 408 and the second row 410 maps the unmasked attribute value stored in the attribute "ACCOUNT_CLEAR" 402 to the two possible values of the protected attribute that is accessible to the two different types of users having different authority levels. For example, the value of "ACCOUNT" attribute 404 in the first row 408 contains the first version of the attribute value (unmasked), while the value of "ACCOUNT" attribute 404 in the second row 410 contains the system generated second version of the attribute value (unique masked value). It should be noted that in an embodiment of the present invention, the security manager program 140 populates the "ACCOUNT_TYPE" attribute 406 with two different values "0" and "1", where "0" indicates unmasked value (in the "ACCOUNT" attribute 404) and "1" indicates masked value (in the "ACCOUNT" attribute 404). Security manager program 140 generates similar two rows for each account value stored in the "ACCOUNT_CLEAR" attribute 202 and 242 of the first transaction table 150 and the second transaction table 152, respectively. Accordingly, the exemplary first security table 400 illustrated in FIG. 4A includes eight rows.

Figure 4B:
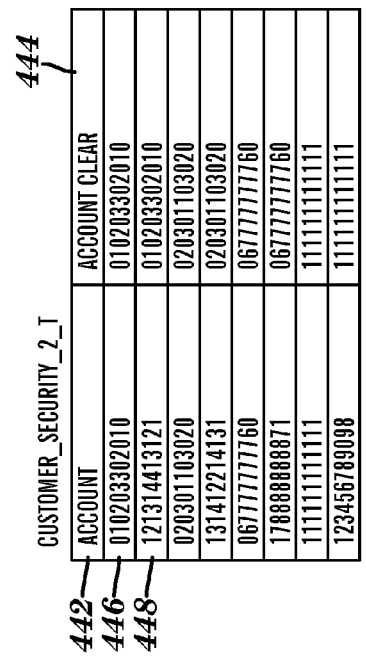

FIG. 4B illustrates exemplary data in second security table 440, according to one embodiment of the present invention. As previously indicated, the security manager program 140 populates (at step 312) the second security table 440 in order to map the two possible versions of the protected attribute value, as discussed above, back to the unmasked attribute value. In an embodiment of the present invention, second security table (for example, CUSTOMER_SECURITY2_T table) 440 includes only two attributes: "ACCOUNT" 442, and "ACCOUNT_CLEAR" 444. Illustratively, the first row 446 and the second row 448 in the second security table 440 contain the following values, respectively:

| Account: | 010203302010 | Account: | 121314413121 |
| Account_Clear: | 010203302010 | Account_Clear: | 010203302010 |

For example, the value of "ACCOUNT" attribute 442 in the first row 446 contains the first version of the attribute value (unmasked), while the value of "ACCOUNT" attribute 442 in the second row 448 contains the second version of the attribute value (unique masked value). Both of those values are mapped to the unmasked attribute value stored in the "ACCOUNT_CLEAR" attribute 444. Security manager program 140 generates similar values for each account value stored in the "ACCOUNT_CLEAR" attribute 202 and 242 of the first transaction table 150 and the second transaction table 152, respectively. Accordingly, the exemplary second security table 440 illustrated in FIG. 4B also includes eight rows.

FIGS. 5A and 5B illustrate how transaction information is presented to database users having different authority levels, according to one embodiment of the present invention. For illustration purposes only assume that first user is authorized to see account values in first transaction table 150 in an unmasked format. First user sends a request to access data in first transaction table 150 via, for example, query interface program 134a. In an embodiment of the present invention, query interface program 134a forwards the first user's request to the security manager program 140. In response to receiving the first user's request, according to an embodiment of the present invention, security manager program 140 performs steps discussed above in conjunction with FIG. 3, including creating and executing the first view (as shown at 316). Subsequently, security manager program 140 sends first view execution results back to the query interface program 134a. In response, the query interface program 134a presents first view execution results 500 to the first user in the form shown in FIG. 5A. As shown in FIG. 5A, attributes "TRANSACTION_ID" 504, "TRANSACTION_DATE" 506 and "TRANSACTION_AMOUNT" 508 contain data derived from the respective attributes 204, 206, and 208 of the first transaction table 150. It should be noted that sensitive data (account values) are presented in "ACCOUNT" attribute 502 in unmasked format based on first user's authority level. Similarly, FIG. 5B illustrates first view execution results 540 with respect to a second user. Assume, for illustrative purposes only, that the second user is authorized to view the sensitive data in a masked format only. As shown in FIG. 5B, attributes "TRANSACTION_ID" 544, "TRANSACTION_DATE" 546 and "TRANSACTION_AMOUNT" 548 contain data derived from the respective attributes 204, 206, and 208 of the first transaction table 150. However, in this case, sensitive data (account values) are presented in "ACCOUNT" attribute 542 in masked format, based on second user's authority level. In summary, in accordance with an embodiment of the present invention, security manager program 140 prevents users from seeing both unmasked and masked sensitive data and, therefore, protects the masking mechanism from being reverse engineered. Furthermore, security manager program 140 implemented in accordance with an embodiment of the present invention, advantageously allows a given user to transparently query the transactional data using either masked or unmasked version of the primary key's sensitive attributes, but never both of them.

Figure 6:
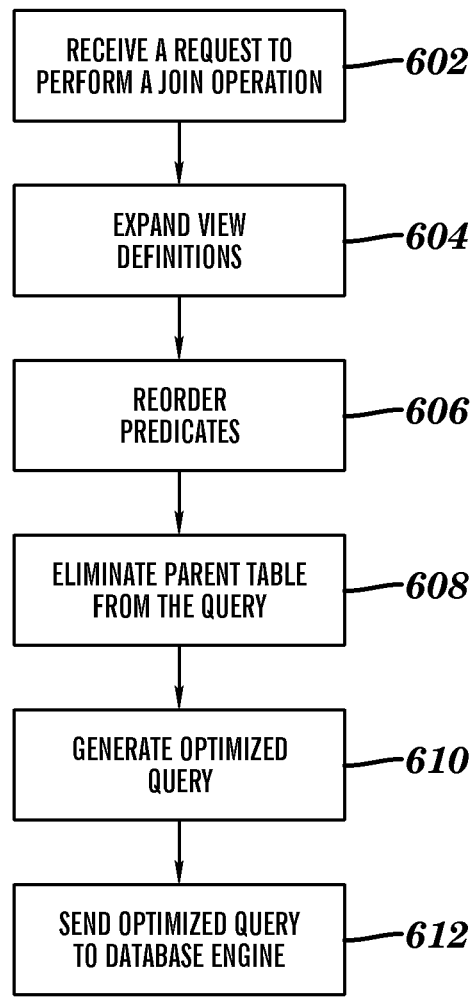
FIG. 6 illustrates steps performed by query optimizer program for performing optimized collocated join operations using the security tables, in accordance with an embodiment of the present invention.

FIG. 6 illustrates steps performed by query optimizer program for performing optimized collocated join operations using the transaction and security tables, in accordance with an embodiment of the present invention. In accordance with an embodiment of the present invention, the parallel data processing system 100 described herein supports an efficient collocated joins between the first view (B) and the second view (C). Collocated join operation, as used herein, refers to a join operation where corresponding rows of the joined tables are located on the same processing node, such as processing nodes 122a-122c and each corresponding partitioning key attribute is in an equal predicate. This type of join is done at the node-level and requires less communication overhead.

At step 602, query optimizer program 132 receives a request to run a query requiring a join operation between the two views (B) and (C) from, for example, query interface program 134a. The following steps describe a process that query optimizer program 132 uses to optimize the received join operation query, in accordance with an embodiment of the present invention. For illustrative purposes only assume that query optimizer program 132 has received the following query requiring a join operation:

```
SELECT A.ACCOUNT, A.TRANSACTION_ID,                     (1)
   A.TRANSACTION_DATE, A.TRANSACTION_AMOUNT,
   B.TRANSACTION_CITY, B.TRANSACTION_STATE,
   B.TRANSACTION_ZIP
FROM CUSTOMER_TRANSACTION1 A,
   CUSTOMER_TRANSACTION2 B
WHERE B.ACCOUNT = A.ACCOUNT
   AND B.TRANSACTION_ID = A.TRANSACTION_ID
   AND B.TRANSACTION_DATE = A.TRANSACTION_DATE;
```

At step 604, query optimizer program 132 expands the received query (1). More specifically, query optimizer program 132 expands the definitions for the first view (B) (CUSTOMER_TRANSACTION1) and the second view (C) (CUSTOMER_TRANSACTION2). Query (2) below is an example of the expanded query (1):

```
SELECT S1A.ACCOUNT, A.TRANSACTION_ID,                   (2)
   A.TRANSACTION_DATE, A.TRANSACTION_AMOUNT,
   B.TRANSACTION_CITY,B.TRANSACTION_STATE,
   B.TRANSACTION_ZIP
FROM CUSTOMER_TRANSACTION1_T A,
   CUSTOMER_TRANSACTION2_T B,
   CUSTOMER_SECURITY1_T S1A, CUSTOMER_SECURITY2_T S2A,
   CUSTOMER_SECURITY1_T S1B, CUSTOMER_SECURITY2_T S2B
WHERE S1B.ACCOUNT = S1A.ACCOUNT
   AND B.TRANSACTION_ID = A.TRANSACTION_ID
   AND B.TRANSACTION_DATE = A.TRANSACTION_DATE
   AND S1A.ACCOUNT_CLEAR = A.ACCOUNT_CLEAR
   AND S1A.ACCOUNT_TYPE = USER_TYPE
   AND S2A.ACCOUNT_CLEAR = S1A.ACCOUNT_CLEAR
   AND S2A.ACCOUNT = S1A.ACCOUNT
   AND S1B.ACCOUNT_CLEAR = B.ACCOUNT_CLEAR
   AND S1B.ACCOUNT_TYPE = USER_TYPE
   AND S2B.ACCOUNT_CLEAR = S1B.ACCOUNT_CLEAR
   AND S2B.ACCOUNT = S1B.ACCOUNT;
```

At step 606, in accordance with an embodiment of the present invention, query optimizer program 132 performs an optional step of reordering the predicates. Query (3) below is an example of the query (2) with the reordered predicates:

```
SELECT S1A.ACCOUNT, A.TRANSACTION_ID,                   (3)
   A.TRANSACTION_DATE, A.TRANSACTION_AMOUNT,
   B.TRANSACTION_CITY, B.TRANSACTION_STATE,
   B.TRANSACTION_ZIP
FROM CUSTOMER_TRANSACTION1_T A,
   CUSTOMER_TRANSACTION2_T B,
   CUSTOMER_SECURITY1_T S1A, CUSTOMER_SECURITY2_T S2A,
   CUSTOMER_SECURITY1_T S1B, CUSTOMER_SECURITY2_T S2B
WHERE S1B.ACCOUNT = S1A.ACCOUNT
   AND S2A.ACCOUNT = S1A.ACCOUNT
   AND S2B.ACCOUNT = S1B.ACCOUNT
   AND S1A.ACCOUNT_CLEAR = A.ACCOUNT_CLEAR
   AND S2A.ACCOUNT_CLEAR = S1A.ACCOUNT_CLEAR
   AND S1B.ACCOUNT_CLEAR = B.ACCOUNT_CLEAR
   AND S2B.ACCOUNT_CLEAR = S1B.ACCOUNT_CLEAR
   AND S1A.ACCOUNT_TYPE = USER_TYPE
   AND S1B.ACCOUNT_TYPE = USER_TYPE
   AND B.TRANSACTION_ID = A.TRANSACTION_ID
   AND B.TRANSACTION_DATE = A.TRANSACTION_DATE;
```

At step 608, query optimizer program 132 eliminates the parent tables (i.e., all occurrences of the second security table 440 from the query (3)). In accordance with one embodiment, query optimizer program 132 achieves the elimination of the parent table by performing the following sub-steps. In the first sub-step, query optimizer program 132 uses transitive closure analysis to generate an "S2A.ACCOUNT=S2B.ACCOUNT" predicate, and then use the unique index, CUSTOMER_SECURITY2_PK (defined above) to generate an "S2A.ACCOUNT_CLEAR=S2B.ACCOUNT_CLEAR" predicate. Transitive closure is a well known group theory analysis and it can be advantageously applied to optimizing SQL queries in accordance with embodiments of the present invention. Transitive analysis of the search conditions of query (3) reveals that "S1B.ACCOUNT=S1A.ACCOUNT" AND "S2A.ACCOUNT=S1A.ACCOUNT" AND "S2B.ACCOUNT=S1B.ACCOUNT". Accordingly, transitive closure establishes the equivalency of "S2A.ACCOUNT" and "S2B.ACCOUNT", i.e. "S2A.ACCOUNT=S2B.ACCOUNT". Similarly, query optimizer program 132 uses determination of the equivalency of "S2A.ACCOUNT_CLEAR" and "S2B.ACCOUNT_CLEAR" to generate an "S2A.ACCOUNT_CLEAR=S2B.ACCOUNT_CLEAR" predicate. The modified exemplary query is provided below:

```
SELECT S1A.ACCOUNT, A.TRANSACTION_ID,                        (4)
A.TRANSACTION_DATE, A.TRANSACTION_AMOUNT,
B.TRANSACTION_CITY, B.TRANSACTION_STATE,
B.TRANSACTION_ZIP
FROM CUSTOMER_TRANSACTION1_T A,
CUSTOMER_TRANSACTION2_T B,
CUSTOMER_SECURITY1_T S1A, CUSTOMER_SECURITY2_T S2A,
CUSTOMER_SECURITY1_T S1B, CUSTOMER_SECURITY2_T S2B
WHERE S1B.ACCOUNT = S1A.ACCOUNT
AND S2A.ACCOUNT = S1A.ACCOUNT AND
S2B.ACCOUNT = S1B.ACCOUNT
AND S2A.ACCOUNT = S2B.ACCOUNT
AND S1A.ACCOUNT_CLEAR = A.ACCOUNT_CLEAR
AND S2A.ACCOUNT_CLEAR = S1A.ACCOUNT_CLEAR
AND S1B.ACCOUNT_CLEAR = B.ACCOUNT_CLEAR
AND S2B.ACCOUNT_CLEAR = S1B.ACCOUNT_CLEAR
AND S2A.ACCOUNT_CLEAR = S2B.ACCOUNT_CLEAR
AND S1A.ACCOUNT_TYPE = USER_TYPE
AND S1B.ACCOUNT_TYPE = USER_TYPE
AND B.TRANSACTION_ID = A.TRANSACTION_ID
AND B.TRANSACTION_DATE = A.TRANSACTION_DATE
```

In the next sub-step, query optimizer program 132 analyzes the following predicates "S1A.ACCOUNT_CLEAR=A.ACCOUNT_CLEAR" and "S2A.ACCOUNT_CLEAR=S1A.ACCOUNT_CLEAR" to determine that "A.ACCOUNT_CLEAR" is equivalent to "S2A.ACCOUNT_CLEAR". Similarly, using the predicates "S1B.ACCOUNT_CLEAR=B.ACCOUNT_CLEAR" and "S2B.ACCOUNT_CLEAR=S1B.ACCOUNT_CLEAR" query optimizer program 132 determines that "B.ACCOUNT_CLEAR" is equivalent to "S2B.ACCOUNT_CLEAR". Furthermore, since "S2A.ACCOUNT_CLEAR=S2B.ACCOUNT_CLEAR", query optimizer program 132 applies transitive closure analysis yet one more time to determine that "A.ACCOUNT_CLEAR=B.ACCOUNT_CLEAR". Therefore, query (4) may be further modified as provided below:

```
SELECT S1A.ACCOUNT, A.TRANSACTION_ID,                        (5)
A.TRANSACTION_DATE, A.TRANSACTION_AMOUNT,
B.TRANSACTION_CITY, B.TRANSACTION_STATE,
B.TRANSACTION_ZIP
FROM CUSTOMER_TRANSACTION1_T A,
CUSTOMER_TRANSACTION2_T B,
CUSTOMER_SECURITY1_T S1A, CUSTOMER_SECURITY2_T S2A,
CUSTOMER_SECURITY1_T S1B, CUSTOMER_SECURITY2_T S2B
WHERE S1B.ACCOUNT = S1A.ACCOUNT
AND S2A.ACCOUNT = S1A.ACCOUNT
AND S2B.ACCOUNT = S1B.ACCOUNT
AND S2A.ACCOUNT = S2B.ACCOUNT
AND S1A.ACCOUNT_CLEAR = A.ACCOUNT_CLEAR
AND S2A.ACCOUNT_CLEAR = S1A.ACCOUNT_CLEAR
AND S1B.ACCOUNT_CLEAR = B.ACCOUNT_CLEAR
AND S2B.ACCOUNT_CLEAR = S1B.ACCOUNT_CLEAR
AND S2A.ACCOUNT_CLEAR = S2B.ACCOUNT_CLEAR
AND A.ACCOUNT_CLEAR = B.ACCOUNT_CLEAR
AND S1A.ACCOUNT_TYPE = USER_TYPE
AND S1B.ACCOUNT_TYPE = USER_TYPE
AND B.TRANSACTION_ID = A.TRANSACTION_ID
AND B.TRANSACTION_DATE = A.TRANSACTION_DATE
```

It should be noted that second security table 440 is in foreign key relationship with the first security table 400. In other words, the second security table 440 is the referential integrity parent of the first security table 400 (child). In addition, in the query (5) the parent and child have equijoin predicates on all of the corresponding attributes of the child's foreign key and the parent's primary key. The term "equijoin", as used herein, refers to a specific type of comparator-based join operation that uses only equality comparisons in the join-predicate. In other words, the primary key attributes of the parent's primary key are used only in equality comparison with the corresponding child's attributes in the join predicate of the query (5) (i.e. "S2A.ACCOUNT=S1A.ACCOUNT" and "S2B.ACCOUNT=S1B.ACCOUNT"). Due to the defined referential integrity (RI) constraints, any set of the child table's foreign key attributes should also exist in the primary key attributes of the parent table. Moreover, attributes of the parent table neither appear in the output list of the query, nor in other predicates, except for the join predicates. Therefore, the join operation between the child and parent tables can be eliminated. In other words, query optimizer program 132 may eliminate the parent table from the query. According to an embodiment of the present invention, query optimizer program 132 uses the above determinations to eliminate all occurrences of the second security table 440 from the query (5). Accordingly, the modified query (5) is provided below as query (6):

```
SELECT S1A.ACCOUNT, A.TRANSACTION_ID,                        (6)
A.TRANSACTION_DATE, A.TRANSACTION_AMOUNT,
B.TRANSACTION_CITY, B.TRANSACTION_STATE,
B.TRANSACTION_ZIP
FROM CUSTOMER_TRANSACTION1_T A,
CUSTOMER_TRANSACTION2_T B,
CUSTOMER_SECURITY1_T S1A,
CUSTOMER_SECURITY1_T S1B
WHERE S1B.ACCOUNT = S1A.ACCOUNT
AND S1A.ACCOUNT_CLEAR = A.ACCOUNT_CLEAR
AND S1B.ACCOUNT_CLEAR = B.ACCOUNT_CLEAR
AND A.ACCOUNT_CLEAR = B.ACCOUNT_CLEAR
AND S1A.ACCOUNT_TYPE = USER_TYPE
AND S1B.ACCOUNT_TYPE = USER_TYPE
AND B.TRANSACTION_ID = A.TRANSACTION_ID
AND B.TRANSACTION_DATE = A.TRANSACTION_DATE
```

At step 610, query optimizer program 132 generates the optimized query. In this step, according to one embodiment of the present invention, query optimizer program 132 further simplifies query (6) by combining, for example, multiple references to the first security table 400 (S1A and S1B) in query (6) into a single reference, since all references have identical primary key values. An exemplary optimized query (7) that may be generated by query optimizer program 132 at this stage is provided below:

```
SELECT S.ACCOUNT, A.TRANSACTION_ID,                      (7)
    A.TRANSACTION_DATE, A.TRANSACTION_AMOUNT,
    B.TRANSACTION_CITY, B.TRANSACTION_STATE,
    B.TRANSACTION_ZIP
FROM CUSTOMER_TRANSACTION1_T A,
    CUSTOMER_TRANSACTION2_T B,
    CUSTOMER_SECURITY1_T S
WHERE S.ACCOUNT_CLEAR = A.ACCOUNT_CLEAR
AND A.ACCOUNT_CLEAR = B.ACCOUNT_CLEAR
AND S.ACCOUNT_TYPE = USER_TYPE
AND B.TRANSACTIONS_ID = A.TRANSACTION_ID
AND B.TRANSACTION_DATE = A.TRANSACTION_DATE;
```

Query (7) is an optimized version of query (2). At step 612, query optimizer program 132 sends the optimized query (7) to database engine program 104. Database engine program 104 executes the optimized query (7) (instead of query (2)), in response to user's request to perform the join operation involving transaction tables. Since the optimized query (7) contains equijoin predicates between all corresponding partitioning key attributes of the security and transaction tables, i.e. "S.ACCOUNT_CLEAR=A.ACCOUNT_CLEAR AND A.ACCOUNT_CLEAR=B.ACCOUNT_CLEAR", a collocated join may be used to execute the query. Therefore, by performing steps described above, in accordance with an embodiment of the present invention, query optimizer program 132 provides parallel data processing RDBMS 133 with a high performance collocated join operation, while at the same time, the parallel data processing RDBMS 133 prevents the end users from accessing the transaction tables' 150 and 152 primary key's sensitive attributes.

Figure 7:
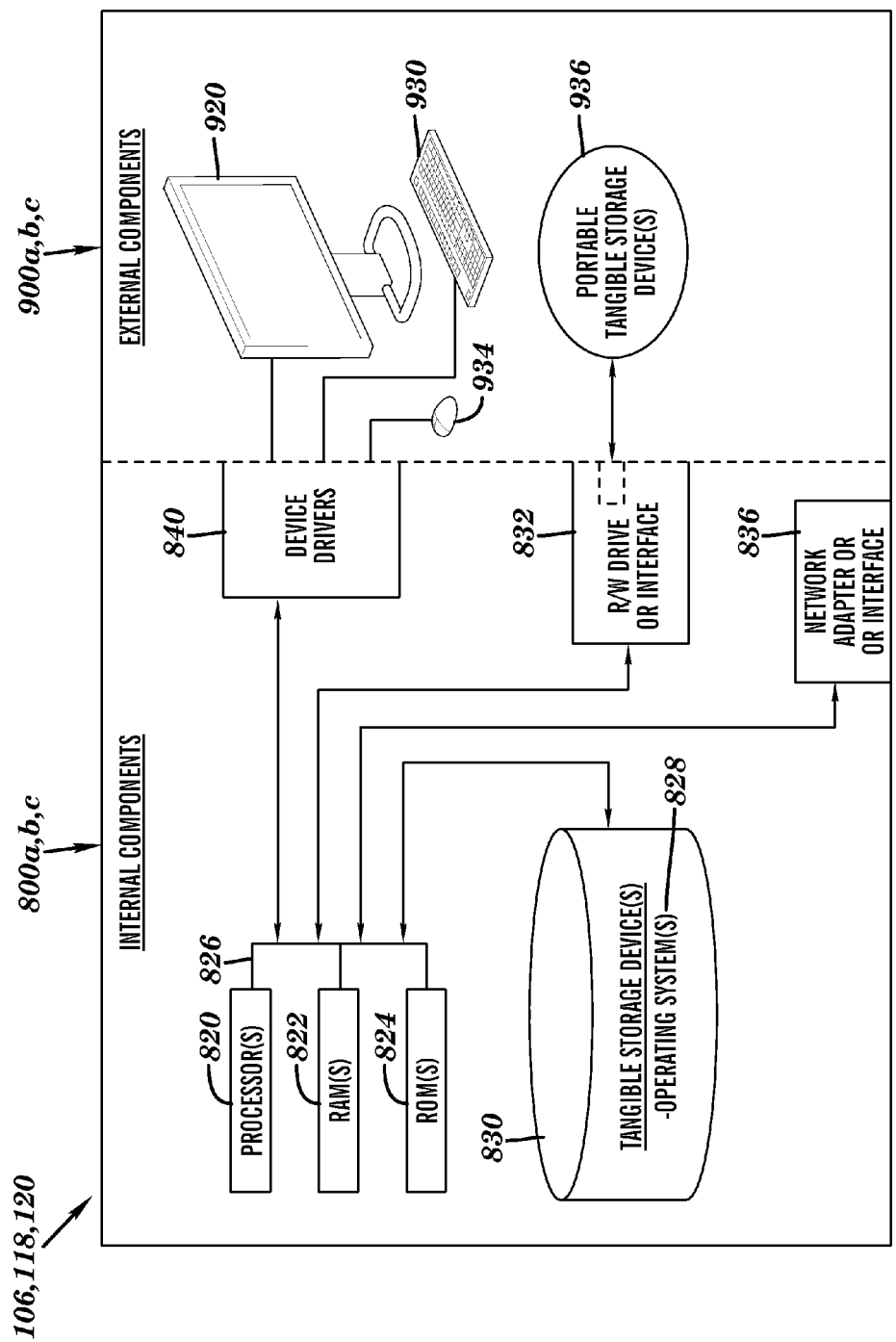
FIG. 7 is a block diagram of internal and external components of each of the computers of FIG. 1.

FIG. 7 is a block diagram of internal and external components of each of the computers of FIG. 1. Computers 106, 118 and 120 include respective sets of internal components 800a, b, c and external components 900a, b, c. Each of the sets of internal components 800a, b, c includes one or more processors 820, one or more computer-readable RAMs 822 and one or more computer-readable ROMs 824 on one or more buses 826, one or more guest operating systems 828 and one or more computer-readable tangible storage devices 830. The one or more operating systems 828 are stored on one or more of the computer-readable tangible storage devices 830 for execution by one or more of the processors 820 via one or more of the RAMs 822 (which typically include cache memory). Database engine program 104, security manager program 140, and query optimizer program 132 are stored on one or more of the computer-readable tangible storage devices 830 of internal components 800a for execution by one or more of the processors 820 of internal components 800a via one or more of the RAMs 822 of internal components 800a. Query interface program 134a and 134b is stored on one or more of the computer-readable tangible storage devices 830 of internal components 800b and 800c for execution by one or more of the processors 820 of internal components 800b and 800c via one or more of the RAMs 822 of internal components 800b and 800c. In the embodiment illustrated in FIG. 7, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a,b,c also includes a R/W drive or interface 832 to read from and write to one or more portable computer-readable tangible storage devices 936 such as a CD-ROM, DVD, memory stick, magnetic tape, magnetic disk, optical disk or semiconductor storage device. At least one of the database engine program 104, security manager program 140, and query optimizer program 132 can be stored on one or more of the portable computer-readable tangible storage devices 936 of external components 900a, read via R/W drive or interface 832 of internal components 800a and loaded into one or more computer-readable tangible storage devices 830 of internal components 800a. Query interface program 134a and 134b can be stored on one or more of the portable computer-readable tangible storage devices 936 of external components 900b and 900c, read via R/W drive or interface 832 of internal components 800b and 800c and loaded into one or more computer-readable tangible storage devices 830 of internal components 800b and 800c, respectively.

Each set of internal components 800a,b,c also includes a network adapter or interface 836 such as a TCP/IP adapter card. Database engine program 104, security manager program 140, and query optimizer program 132 can be downloaded to server computer 106 and query interface program 134a and 134b can be downloaded to client computers 118 and 120, respectively, from an external computer via a network (for example, the Internet, a local area network or other, wide area network) and network adapter or interface 836 of internal components 800a, 800b and 800c, respectively. From the network adapter or interface 836 of internal components 800a, 800b and 800c, database engine program 104, security manager program 140, query optimizer program 132, and query interface program 134a and 134b, respectively, are loaded into one or more computer-readable tangible storage devices 830 of internal components 800a, 800b and 800c, respectively. The network may comprise copper wires, optical fibers, wireless transmission, routers, firewalls, switches, gateway computers and/or edge servers.

Each of the sets of external components 900a,b,c includes a computer display monitor 920, a keyboard 930, and a computer mouse 934. Each set of internal components 800a,b,c also includes device drivers 840 to interface to computer display monitor 920, keyboard 930 and computer mouse 934. The device drivers 840, R/W drive or interface 832 and network adapter or interface 836 comprise hardware and software (stored in one or more computer-readable tangible storage devices 830 and/or one or more computer-readable ROMs 824).

Database engine program 104, security manager program 140, query optimizer program 132, and query interface program 134a and 134b can be written in various programming languages including low-level, high-level, object-oriented or non object-oriented languages. Alternatively, the functions of database engine program 104, security manager program 140, query optimizer program 132, and query interface program 134a and 134b can be implemented in whole or in part by computer circuits and other hardware (not shown).

The description above has been presented for illustration purposes only. It is not intended to be an exhaustive description of the possible embodiments. One of ordinary skill in the art will understand that other combinations and embodiments are possible.

What is claimed is:

1. A method for secure data access in a parallel processing system, the method comprising:

providing a relational database having a first table and a second table, wherein the first table contains a first plurality of sensitive data and the second table contains a second plurality of sensitive data, wherein a sensitive attribute serves as a subset of a primary key for access to the first plurality of sensitive data stored on the first table, wherein the sensitive attribute serves as a subset of a primary key for access to the second plurality of sensitive data stored on the second table, wherein a user is authorized to access the first plurality of sensitive data and the second plurality of sensitive data in an unmasked format or in a masked format based on a plurality of predefined authentication credentials associated with the user, wherein the plurality of predefined authentication credentials are stored in a global variable associated with the user;

generating a first security table having a plurality of entries mapping the first plurality of sensitive data associated with the sensitive attribute in the unmasked format to the first plurality of sensitive data associated with the sensitive attribute in the masked format;

generating a second security table having a plurality of entries mapping the second plurality of sensitive data associated with the sensitive attribute in the masked format to the second plurality of sensitive data associated with the sensitive attribute in the unmasked format; and generating a security view joining the first security table to the second security table, wherein the security view grants the user access to the first plurality of sensitive data and the second plurality of sensitive data in the unmasked format only or in the masked format only based on the global variable associated with the user matching the sensitive attribute.

2. The method of claim 1, wherein the second security table is a referential integrity parent of the first security table.

3. The method of claim 1, wherein the sensitive attribute comprises a partitioning key attribute in the parallel processing system.

4. The method of claim 1, further comprising generating a first view and a second view, wherein the first view controls the user's access to the first plurality of sensitive data in the first table, wherein the first view joins the first table to the security view, and wherein the second view controls the user's access to the second plurality of sensitive data in the second table, and wherein the second view joins the second table to the security view.

5. The method of claim 4, further comprising performing a join operation between the first view and the second view.

6. The method of claim 5, wherein the join operation comprises a collocated join operation.

7. The method of claim 6, wherein performing the collocated join operation comprises:

receiving a first query from the relational database, the first query comprising the join operation between the first view and the second view;

generating a second query by expanding the first view in accordance with a first view definition and by expanding the second view in accordance with a second view definition, wherein the second query includes a first join predicate that includes a first attribute of the first security table and the second query includes a second join predicate that includes the first attribute of the second security table;

generating a third query by eliminating at least the second join predicate, wherein the third query comprises an optimized version of the first query; and executing the third query in the relational database.

8. A computer program product for secure data access in a parallel Processing system, the computer program product comprising one or more computer-readable tangible storage devices and a plurality of program instructions stored on one or more computer-readable tangible storage devices, the plurality of program instructions comprising:

program instructions to provide a relational database having a first table and a second table, wherein the first table contains a first plurality of sensitive data and the second table contains a second plurality of sensitive data, wherein a sensitive attribute serves as a subset of a primary key for access to the first plurality of sensitive data stored on the first table, wherein the sensitive attribute serves as a subset of a primary key for access to the second plurality of sensitive data stored on the second table, wherein a user is authorized to access the first plurality of sensitive data and the second plurality of sensitive data in an unmasked format or in a masked format based on a plurality of predefined authentication credentials associated with the user, wherein the plurality of predefined authentication credentials are stored in a global variable associated with the user;

program instructions to generate a first security table having a plurality of entries mapping the first plurality of sensitive data associated with the sensitive attribute in the unmasked format to the first plurality of sensitive data associated with the sensitive attribute in the masked format;

program instructions to generate a second security table having a plurality of entries mapping the second plurality of sensitive data associated with the sensitive attribute in the masked format to the second plurality of sensitive data associated with the sensitive attribute in the unmasked format; and program instructions to generate a security view joining the first security table to the second security table, wherein the security view grants the user access to the first plurality of sensitive data and the second plurality of sensitive data in the unmasked format only or in the masked format only based on the global variable associated with the user matching the sensitive attribute.

9. The computer program product of claim 8, wherein the second security table is a referential integrity parent of the first security table.

10. The computer program product of claim 8, wherein the sensitive attribute comprises a partitioning key attribute in the parallel processing system.

11. The computer program product of claim 8, further comprising program instructions to generate a first view and a second view, wherein the first view controls the user's access to the first plurality of sensitive data in the first table, wherein the first view joins the first table to the security view, and wherein the second view controls the user's access to the second plurality of sensitive data in the second table, and wherein the second view joins the second table to the security view.

12. The computer program product of claim 11, further comprising program instructions to perform a join operation between the first view and the second view.

13. The computer program product of claim 12, wherein the program perform join operation comprise program instructions to perform a collocated join operation.

14. The computer program product of claim 13, wherein the program instructions to perform a collocated join operation comprise:

program instructions to receive a first query from the relational database, the first query comprising the join operation between the first view and the second view;

program instructions to generate a second query by expanding the first view in accordance with a first view definition and by expanding the second view in accordance with a second view definition, wherein the second query includes a first join predicate that includes a first attribute of the first security table and the second query includes a second join predicate that includes the first attribute of the second security table;

program instructions to generate a third query by eliminating at least the second join predicate, wherein the third query comprises an optimized version of the first query; and program instructions to execute the third query in the relational database.

15. A computer system for secure data access in a parallel processing system, the computer system comprising one or more processors, one or more computer-readable tangible storage devices, and a plurality of program instructions stored on one or more storage devices for execution by one or more processors, the plurality of program instructions comprising:

program instructions to provide a relational database having a first table and a second table, wherein the first table contains a first plurality of sensitive data and the second table contains a second plurality of sensitive data, wherein a sensitive attribute serves as a subset of a primary key for access to the first plurality of sensitive data stored on the first table, wherein the sensitive attribute serves as a subset of a primary key for access to the second plurality of sensitive data stored on the second table, wherein a user is authorized to access the first plurality of sensitive data and the second plurality of sensitive data in an unmasked format or in a masked format based on a plurality of predefined authentication credentials associated with the user, wherein the plurality of predefined authentication credentials are stored in a global variable associated with the user;

program instructions to generate a first security table having a plurality of entries mapping the first plurality of sensitive data associated with the sensitive attribute in the unmasked format to the first plurality of sensitive data associated with the sensitive attribute in the masked format;

program instructions to generate a second security table having a plurality of entries mapping the second plurality of sensitive data associated with the sensitive attribute in the masked format to the second plurality of sensitive data associated with the sensitive attribute in the unmasked format; and program instructions to generate a security view joining the first security table to the second security table, wherein the security view grants the user access to the first plurality of sensitive data and the second plurality of sensitive data in the unmasked format only or in the masked format only based on the global variable associated with the user matching the sensitive attribute.

16. The computer system of claim 15, wherein the second security table is a referential integrity parent of the first security table.

17. The computer system of claim 15, wherein the sensitive attribute comprises a partitioning key attribute in the parallel processing system.

18. The computer system of claim 15, further comprising program instructions to generate a first view and a second view, wherein the first view controls the user's access to the first plurality of sensitive data in the first table, wherein the first view joins the first table to the security view, and wherein the second view controls the user's access to the second plurality of sensitive data in the second table, and wherein the second view joins the second table to the security view.

19. The computer system of claim 18, further comprising program instructions to perform a join operation between the first view and the second view.

20. The computer system of claim 19, wherein the program instructions to perform join operation comprise program instructions to perform a collocated join operation.

* * * * *